C. LAMB & T. J. FRAZIER.

Machines for Trimming Lumber.

No. 6,064. Reissued Sept. 22, 1874.

Witnesses:

Henrich L. Barnes

H. C. Whitney

Inventor:

Chancey Lamb

Thos J. Frazier

By Coburn & Mundy Attys

THE GRAPHIC CO. PHOTO-LITH. 39 & 41 PARK PLACE, N.Y.

UNITED STATES PATENT OFFICE.

CHANCY LAMB AND THOMAS J. FRAZIER, OF CLINTON, IOWA.

IMPROVEMENT IN MACHINES FOR TRIMMING LUMBER.

Specification forming part of Letters Patent No. 138,505, dated May 6, 1873; reissue No. 6,064, dated September 22, 1874; application filed March 17, 1874.

*To all whom it may concern:*

Be it known that we, CHANCY LAMB and THOMAS J. FRAZIER, of Clinton, in the county of Clinton and State of Iowa, have invented a new and useful Improvement in Machines for Trimming Lumber; and we do declare that the following is a true and accurate description thereof, reference being had to the accompanying drawing and to the letters of reference marked thereon, and being a part of this specification, in which—

Figure 1:
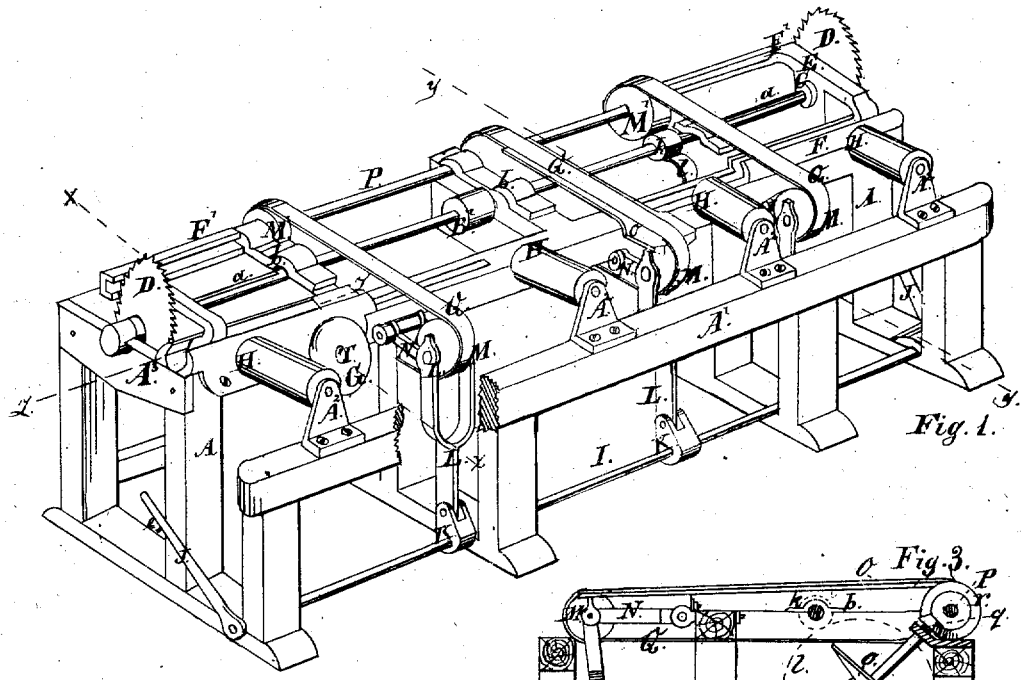
Figure 3:
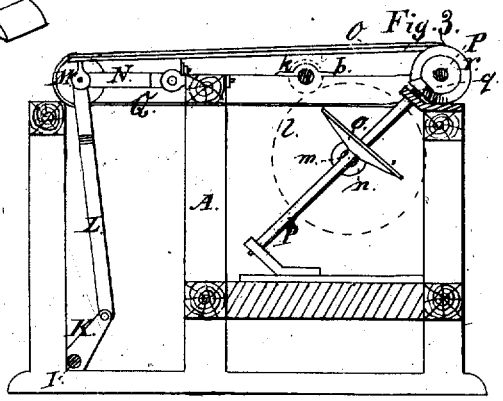
Figure 2:
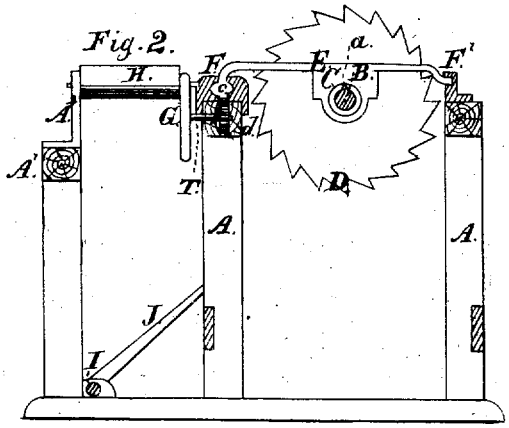
Figure 5:
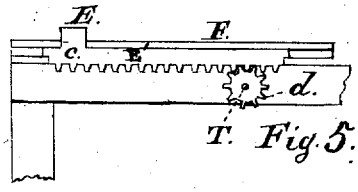
Figure 4:
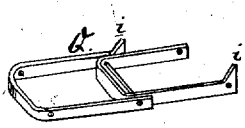

Figure 1 is a perspective view of our improved machine. Fig. 2 is a cross-section at *x x* of Fig. 1. Fig. 3 is a cross-section at *y y*, and Fig. 4 is a short section of the carrier-chain. Fig. 5 is a longitudinal section of a guide, F, at *z z*, Fig. 1.

Like letters refer to like parts in each figure.

In the drawing, A represents a frame of timber-work put together as shown, and about twenty feet in length. B is a shaft or arbor journaled in boxes *b* on top of the main frame. At each end of the shaft there is a feather, *a*. A pulley, B′, is secured on the shaft or arbor, so that it may be rotated by a belt from a shaft below the mill-floor. C is a collar sliding on the feather at each end of the shaft, and carries also a circular saw, D. E is a yoke or rest for the lumber. It slides in guides F F′ at each end of the frame, across which it reaches. It also embraces an annular feather on the collar, so that, as the yoke is moved longitudinally in its guides, it will carry the collar and saw with it, the saw being rotated by the arbor.

It will be seen that this rest or yoke, moving with the saw at all changes of its position upon the arbor, affords a bearing for the end of the lumber immediately adjacent to the saw, and prevents it from sagging and binding upon said saw during the cutting.

The end of each yoke or rest nearest the front side of the machine has cast with it, at a right angle with the body, a rack-bar, E′, having a toothed rack, *c*, on the under face. With this rack a pinion, *d*, on a short shaft, T, engages, said shaft being journaled in the front upper stringer of the main frame, and is provided with a hand-wheel, G, by which it may be rotated, and thus move the saw and rest together upon the arbor. H are rollers, whose inner ends are journaled in the front stringer of the main frame A, while their outer ends are journaled in standards $A^2$ rising from a lower part, $A^1$, of, and in front of, the main frame. On these rollers the board is moved lengthwise of the machine, and the saws and their yokes or rests are adjusted to square its ends by the hand-wheels, only one of which is ordinarily used, except when a defective end of the board is to be cut off.

The board could now be pushed back by the two men who tend the machine, and be trimmed by the saws, the yokes or rests E E supporting the ends of the board while being cut, but this would involve the expenditure of much muscular force, and a waste of time. To overcome these difficulties we provide for the automatic feeding up of the board or boards, when several are piled together, to the saws in the following manner: In the lower front angle of the frame $A^1$ we journal a rock-shaft, I, with a lever, J, at each end, said lever being supported in an inclined position by a pin, *e*. On the shaft I several rocker-arms, K, are secured, to each of which is pivoted the lower end of a forked connecting-rod, L, in whose jaws is pivoted a pulley, M. The shaft of the pulley M is also journaled in the fork of a radius-link, N, which is pivoted to the front of the main frame. O is a wooden guide-rod, its front end resting on projections at the upper extremities of the forked rod L, and is slotted to allow the pulley to revolve freely. The back end of the guide-rod or grooved support, extending nearly to the back of the main frame, is pivoted thereto. By throwing up either of the levers J all the pulleys M will be slightly raised, so as to bring them above the plane of the rollers H. P is a shaft journaled along the back edge of the main frame, and carries the pulleys M′, one opposite each pulley M. Around these pulleys run the endless chains Q, the upper limb of each running in the guide-rod which supports it. The construction of these chains is peculiar. The links are bent to a U-shape, nearly, from flat bars, set upon edge, with the jaws of one link embracing, and pivoted to, the base of the next. One end of each link-bar has formed on it an upward-projecting spur, *i*, and these spurs are alternately placed in the chain, so as to present a spur with every second link at each side of the chain.

It is evident, therefore, that if the shaft P is rotated so as to carry the chains toward the track of the frame, while the chains are below the plane of the rollers H, the lumber may be piled on said rollers, and run back and forth longitudinally, but by lifting the lever J at either end the pulleys M will be raised, and with them the guide-rods and chains. The spurs of the latter, taking hold of the under face of the boards, will carry them bodily past the saws, which will trim the ends, and finally discharge the lumber at the back of the machine.

The rotation of the shaft may be effected in several ways, but we prefer the following: On the saw-arbor we key a friction-pulley, *k*, which gives motion to a larger pulley, *l*, on a shaft, *m*, journaled below. On the end of this shaft is a bevel friction-wheel, *o*, keyed to an inclined shaft, *p*, transversely journaled in the frame. At the anterior end of the shaft *p* a bevel friction-wheel, *q*, is keyed, which rotates the shaft P through a friction-pinion, *r*, as shown in Fig. 3. The feeding up of the lumber is thus effected without expenditure of muscular labor beyond moving one of the levers J, and the feed is geared up to the cutting capacity of the saws.

For cutting lumber into short lengths, as for box material, stationary saws are secured on the arbor at the proper points, and thus cut off, while the ends of the boards are at the same time being trimmed.

To facilitate the removal and replacement of the saws on the arbor, the ends of the latter are journaled in an iron girt, $A^3$, at each end of the frame A, which girt is secured by one or more bolts at each side, so as to be easily removed when required.

What we claim as our invention, and desire to secure by Letters Patent, is—

1. The adjustable yoke E, and saw D, and guide F, and rollers H, substantially as specified.

2. The movable pulleys M, pulleys M′, endless chains Q, and rollers H, as and for the purposes specified.

3. The rock-shaft I, levers J, rocker-arms K, forked connecting-rods L, radius-links N, pulleys M M′, guide-rods O, chains Q, and shaft P, the latter rotated in any convenient manner, and all operating, substantially in the manner described, for carrying the lumber to and past the saws.

4. The arrangement, with relation to the arbor B, of the friction gears or pulleys *k l n o q r* and shafts *m* and *p* for rotating the shaft P, as shown and set forth.

CHANCY LAMB.
THOMAS J. FRAZIER.

Witnesses as to signature of C. LAMB:
W. E. YOUNG,
A. G. EWING.

Witnesses as to signature of T. J. FRAZIER:
T. J. FRAZIER,
JOHN W. MUNDAY.